PHOSPHONATE COMPOSITIONS

Clinton W. MacMullen, Hamden, Conn., and Jack Rockett, Metuchen, N.J., assignors to Olin Mathieson Chemical Corporation, New Haven, Conn., a corporation of Virginia
No Drawing. Filed Jan. 6, 1958, Ser. No. 707,099
8 Claims. (Cl. 260—461)

This invention relates to a novel class of chemical compounds. More particularly, this invention relates to aryloxypolyalkylene ether phosphonates and the water soluble salts thereof and to methods for their preparation.

The compounds of the present invention are represented by the general formula:

$$R—(O—A)_n—PO_3M_2$$

in which R is an aromatic hydrocarbon radical, A represents alkylene groups having at least two carbon atoms, $n$ is a positive integer and M is a metal or hydrogen. Representative values for R are the aromatic radicals derived from phenols, or naphthols such as phenol, o-, m-, or p-cresol, any of the isomeric xylenols, thymol, or carvacrol. Preferably, however, the aromatic radicals are derived from alkyl or polyalkyl substituted phenols such as the straight or branched chain butyl, amyl, hexyl, heptyl, octyl, nonyl, decyl, dodecyl, hexadecyl or octadecyl phenols or cresols; or the phenyl, cyclohexyl and benzyl phenols; naphthol and similarly substituted naphthols.

The compounds of the present invention, and in particular the water soluble salts, have been found to have a high degree of capillary activity and to exhibit useful properties as surface active materials. For example, the compound disodium p-octyl-phenoxyethoxyethylphosphonate, in 1% solution, lowered the surface tension of water from 73 dynes/cm. to 27.6 dynes/cm., and, in 0.1% solution, to 36.6 dynes/cm. The compound disodium p-octylphenoxyethoxyethoxyethylphosphonate, in 1% solution, lowered the surface tension of water to 30.2 dynes/cm. and, in 0.1% solution to 29.6 dynes/cm. The compounds of this invention are well adapted for use as wetting, dispersing, emulsifying, cleansing and spreading agents in the textile, leather and paper industries and in laundering and dishwashing, as well as in other fields where their surface active properties are useful.

The compounds of this invention are prepared by reacting a trialkyl phosphite with an aryloxypolyalkylene ether halide to form the corresponding dialkyl phosphonate, which is then hydrolyzed to the corresponding phosphonic acid. The salts of the phosphonic acid are then readily formed by neutralization with a suitable base.

In carrying out the above sequence of reactions, a trialkyl phosphite of the formula $(R'O)_3P$, wherein R' is an alkyl group, is heated with an aryloxypolyalkylene ether halide of the formula:

$$R—(O—A)_n—X$$

in which X is a halogen atom to provide the dialkyl phosphonate of the formula:

$$R—(O—A)_n—P(O)(OR')_2$$

wherein R, R', A and $n$ have the values heretofore defined.

The aryloxypolyalkylene ether halides employed above can be prepared according to known procedures, for example, by condensing a phenol with a dihalogeno polyalkylene ether of the formula:

$$X—(A—O)_n—A—X$$

in the presence of a strongly alkaline condensing agent under such conditions that only one of the halogen atoms is substituted by the aryloxy group. The dihalogeno polyalkylene ethers used in condensing with the phenols are preferably those in which the alkylene groups have two, three, or four carbon atoms which may be arranged in a straight chain or branched chain when the group has three or four carbon atoms. Among these dihalogeno polyalkylene ethers are $\beta,\beta'$-dichlorodiethyl ether, $\beta,\beta'$-dichlorodipropyl ether, $\beta,\beta'$-dichlorodiisopropyl ether, bis-(2-chloroethoxy) ethane, $$Cl—CH_2CH_2OCH_2CH_2OCH_2CH_2Cl$$

and their higher homologs. The corresponding dibromo and diiodo compounds may also be used.

The dialkyl phosphonate produced by the aforementioned reaction is hydrolyzed to the corresponding phosphonic acid by boiling with an aqueous mineral acid, such as hydrochloric or sulfuric acids. To facilitate this hydrolytic process some high boiling mutual solvent may be used, such as dioxane or methyl Cellosolve. Such a solvent, it has been found, causes a homogeneous solution to obtain between the phosphonate and the mineral acid instead of the two layer non-homogeneous system which would otherwise be the case. The hydrolysis, therefore, proceeds more rapidly and goes to completion. The phosphonic acid which is thereby obtained corresponds to the general formula:

$$R—O—A—(O—A)_n—O—A—P(O)(OH)_2$$

This acid is neutralized by a suitable base, such as MOH or MOR, where M is a metal or a positive radical, such as sodium, potassium, or ammonium, and R is an alkyl group, such as methyl, ethyl, propyl, and the like. The resulting compound of the general formula:

$$R—O—A—(O—A)_n—O—A—P(O)(OM)_2$$

is a highly surface active material with excellent wetting and emulsifying properties.

The invention is more fully described in the following specific examples which are for purposes of illustration only and are not to be construed as limiting the present invention, the scope of which is defined in the appended claims.

EXAMPLE I

*O,O'-Diethyl p-Octylphenoxyethoxyethylphosphonate*

62.5 g. (0.2 mole) of p-octylphenoxyethoxyethylchloride and 33.2 g. (0.2 mole) of triethyl phosphite were placed in a flask equipped with a stirrer and condenser. The reactants were stirred and heated to 200° for eight hours. Unreacted starting material was then removed from the reaction mixture by distillation. After all unreacted starting material had been removed the remaining reaction mixture was distilled at a head temperature of 195–207°/0.4 mm. to give 46.6 g. of the product of this example, $n_D^{25}$ 1.4920. This represented a 56.3% yield.

*Analysis.*—Calcd. for $C_{22}H_{39}O_5P$: P, 7.49%. Found: P, 7.19%.

EXAMPLE II

*p-Octylphenoxyethoxyethylphosphonic Acid*

In a flask equipped with a condenser there was placed 36.1 g. (.0872 mole) of O,O'-diethyl p-octylphenoxyethoxyethylphosphonate, 150 cc. of concentrated hydrochloric acid and 125 cc. of ethylene glycol monomethyl ether. The solution was heated to reflux temperature and maintained at reflux for seven hours. The reaction mixture was then distilled, a mixture of ethylene glycol monomethyl ether and water distilling over first. Distillation was continued, adding more water to the residue as required, until all of the ethylene glycol monomethyl ether was removed. The organic material was separated, dissolved in ether, and washed with aqueous salt solution. The ether layer was then dried over anhydrous sodium sulfate, filtered, and the ether evaporated, leaving 31.1 g. of the product of this example, a clear yellow resin. This represents a 99.7% yield.

*Analysis.*—Calcd. for $C_{18}H_{31}O_5P$: P, 8.66%. Found: P, 8.1, 8.5%.

EXAMPLE III

*Disodium p-Octylphenoxyethoxyethylphosphonate*

To 27.6 g. (0.0772 mole) of p-octylphenoxyethoxyethylphosphonic acid dissolved in 100 cc. of absolute ethanol there was added a solution of 8.8 g. (0.1544 mole) of sodium methylate dissolved in 65 cc. of methanol. A white precipitate formed during this addition. The slurry was heated on a steam bath, with stirring, and then allowed to cool. About 50 cc. of acetone was added, the slurry was well stirred, and then suction filtered. After drying as thoroughly as possible, the filter cake was placed in a vacuum desiccator over phosphorus pentoxide and evacuated to 0.1 mm. After standing overnight there was obtained 28.0 g. of the product of this example, a white powder, representing a 90.3% yield.

*Analysis.*—Calcd. for $C_{18}H_{29}O_5PNa_2$: P, 7.72%. Found: P, 7.30%.

EXAMPLE IV

*O,O'-Diethyl p-Octylphenoxyethoxyethoxyethylphosphonate*

In a flask was placed 142.7 g. (0.4 mole) of p-octylphenoxyethoxyethoxyethylchloride and 66.5 g. (0.4 mole) of triethyl phosphite. The reaction mixture was heated to 200° for fifteen hours. At the end of this period, the flask contents were distilled up to a pot temperature of 204°/0.2 mm. The oil residue was then steam distilled, extracted with ether, washed and dried over sodium sulfate. Filtration and evaporation of the ether left a clear oil, 166.3 g.; a 90.8% yield. This oil was redistilled to provide 138.4 g. of a residual clear yellow oil, $n_D^{25}$ 1.4922, all forecuts being discarded up to pot temperatures of 219°/0.6 mm. This represents a 75.7% yield.

*Analysis.*—Calcd. for $C_{24}H_{43}O_6P$: P, 6.77%. Found: P, 6.60%.

EXAMPLE V

*p-Octylphenoxyethoxyethoxyethylphosphonic Acid*

In a flask was placed 133.4 g. (0.282 mole) of O,O'-diethyl p-octylphenoxyethoxyethoxyethylphosphonate, 300 cc. of concentrated hydrochloric acid, and 200 cc. of dioxane. The mixture was heated to boiling under a reflux condenser for twelve hours. The dioxane plus water was distilled at reduced pressure, 56–60°/170 mm. More water was added to the flask and the distillation was continued until all of the dioxane had been removed. The oil layer in the residue solidified upon cooling. It was taken up in ether and washed with dilute sodium chloride solution about three times. The ether solution was then dried over anhydrous sodium sulfate. Filtration followed by evaporation of the ether left 105.6 g. of the product of this example, an amber oil. This represents a 93.2% yield.

*Analysis.*—Calcd. for $C_{20}H_{35}O_6P$: P, 7.72%. Found: P, 6.68%.

EXAMPLE VI

*Disodium p-Octylphenoxyethoxyethoxyethylphosphonate*

In a large beaker was placed 21.2 g. (0.0528 mole) of p-octylphenoxyethoxyethoxyethylphosphonic acid. To it was added a solution of 7.2 g. (0.1256 mole) of sodium methylate in 50 cc. of absolute ethanol. A white precipitate formed during this addition. The slurry was warmed on the steam bath, cooled, and then suction filtered. The filter cake was now triturated with cold anhydrous acetone and suction filtered again. The filter cake was dried overnight in a vacuum desiccator, over phosphorus pentoxide, evacuated to 0.1 mm. pressure. 18.0 g. of the product of this example, a brown wax, was obtained. This represents a 76.5% yield.

*Analysis.*—Calcd. for $C_{20}H_{33}O_6PNa_2$: P, 6.95%. Found: P, 6.14%.

We claim:

1. A compound which exhibits surface activity in water selected from the group of compounds having the following structural formulas:

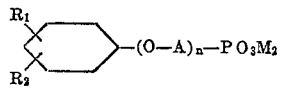

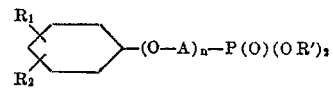

wherein $R_1$ is a nuclear alkyl substituent having between 4 and 18 carbon atoms, inclusive, $R_2$ is a nuclear substituent selected from the group consisting of hydrogen and methyl, A is an alkylene group having at least two carbon atoms, n is a positive integer greater than 1 and less than 4, M is selected from the group consisting of hydrogen, alkali and alkaline earth metals, and R' is a lower alkyl group.

2. A compound according to claim 1 in which $R_2$ is hydrogen.

3. Disodium p - octylphenoxyethoxyethoxyethylphosphonate.

4. p-Octylphenoxyethoxyethoxyethylphosphonic acid.

5. O,O'-diethyl p - octylphenoxyethoxyethoxyethylphosphonate.

6. Disodium p-octylphenoxyethoxyethylphosphonate.

7. p-Octylphenoxyethoxyethylphosphonic acid.

8. O,O' - diethyl p - octylphenoxyethoxyethylphosphonate.

References Cited in the file of this patent

FOREIGN PATENTS 751,755    Great Britain _____ July 4, 1956

OTHER REFERENCES

Mikhailova, N.: "Chem. Abst.," vol. 40, col. 555 (1946).

Walsh et al.: "J. Am. Chem. Soc.," 78, 4455–4458 (September 1956).

UNITED STATES PATENT OFFICE
Certificate of Correction

May 1, 1962

Patent No. 3,032,578

Clinton W. MacMullen et al.

It is hereby certified that error appears in the above-numbered patent requiring correction and that the said Letters Patent should read as corrected below.

In the grant, lower right-hand corner, the paragraph should appear as shown below instead of as in the patent:

*In testimony whereof I have hereunto set my hand and caused the seal of the Patent Office to be affixed at the City of Washington this first day of May, in the year of our Lord, one thousand nine hundred and sixty-two, and of the Independence of the United States of America the one hundred and eighty-sixth.*

Column 4, line 46, for "p-octylphenoxyethoxyethoxyethyl-" read —p-octylphenoxyethoxyethoxyethylphosphonate.—.

Signed and sealed this 11th day of September 1962.

[SEAL]

Attest:
ERNEST W. SWIDER,
*Attesting Officer.*

DAVID L. LADD,
*Commissioner of Patents.*